US011513930B2

(12) United States Patent
Chan et al.

(10) Patent No.: US 11,513,930 B2
(45) Date of Patent: Nov. 29, 2022

(54) LOG-BASED STATUS MODELING AND PROBLEM DIAGNOSIS FOR DISTRIBUTED APPLICATIONS

(71) Applicant: International Business Machines Corporation, Armonk, NY (US)

(72) Inventors: Yuk L. Chan, Rochester, NY (US); Lin Yang, Beijing (CN); Tian Wu, Beijing (CN); Jia Qi Li, Beijing (CN); Lei Yu, Sleepy Hollow, NY (US); Hong Min, Poughkeepsie, NY (US); Fan Jing Meng, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 21 days.

(21) Appl. No.: 17/110,513

(22) Filed: Dec. 3, 2020

(65) Prior Publication Data

US 2022/0179763 A1    Jun. 9, 2022

(51) Int. Cl.
| | | |
|---|---|---|
| *G06F 11/00* | (2006.01) | |
| *G06F 11/30* | (2006.01) | |
| *G06K 9/62* | (2022.01) | |
| *G06F 11/32* | (2006.01) | |

(52) U.S. Cl.
CPC ........ *G06F 11/302* (2013.01); *G06F 11/3006* (2013.01); *G06F 11/3075* (2013.01); *G06F 11/328* (2013.01); *G06K 9/6215* (2013.01)

(58) Field of Classification Search
CPC .............. G06F 11/0751; G06F 11/079; G06F 11/0778; G06F 11/3476; G06F 11/0709; G06F 11/3075
See application file for complete search history.

(56) References Cited

U.S. PATENT DOCUMENTS

| | | |
|---|---|---|
| 6,349,290 B1 | 2/2002 | Horowitz et al. |
| 7,506,195 B2 | 3/2009 | Takahashi et al. |
| 7,742,875 B2 | 6/2010 | Li et al. |

(Continued)

FOREIGN PATENT DOCUMENTS

| | | |
|---|---|---|
| CN | 101325520 B | 8/2010 |
| CN | 103761173 A | 4/2014 |

(Continued)

OTHER PUBLICATIONS

Chen et al.; "Correlated Anomaly Detection From Large Streaming Data", BigData IEEE International Conference on, pp. 1-11, Dec. 10-13, 2018.

(Continued)

*Primary Examiner* — Charles Ehne
(74) *Attorney, Agent, or Firm* — Cantor Colburn LLP; Teddi Maranzano

(57) ABSTRACT

Techniques include collecting current logs from distributed sources, selecting a group of the current logs that are from a related source of the distributed sources, and generating a feature vector using the group of the current logs. A current status model is created for the feature vector using the group of the current logs. One or more anomalies are determined in the group of the current logs based on a difference between the current status model and a reference status model, the reference status model being based on history logs.

20 Claims, 15 Drawing Sheets

(56) References Cited

U.S. PATENT DOCUMENTS

| | | | |
|---|---|---|---|
| 7,856,575 | B2 | 12/2010 | Bock et al. |
| 7,860,815 | B1 | 12/2010 | Tangirala |
| 8,065,336 | B2 | 11/2011 | Armstrong et al. |
| 8,229,953 | B2 | 7/2012 | Kapuram et al. |
| 8,495,429 | B2 | 7/2013 | Fu et al. |
| 9,086,944 | B2 | 7/2015 | Lentile et al. |
| 9,164,983 | B2 | 10/2015 | Liu et al. |
| 9,215,164 | B2 | 12/2015 | Scharf et al. |
| 9,225,730 | B1 | 12/2015 | Brezinski |
| 9,244,755 | B2 | 1/2016 | Huang et al. |
| 9,298,453 | B2 | 3/2016 | Vangala et al. |
| 9,354,961 | B2 | 5/2016 | Nagura et al. |
| 9,367,809 | B2 | 6/2016 | Puri et al. |
| 9,413,837 | B2 | 8/2016 | Vaccari et al. |
| 9,633,106 | B1 | 4/2017 | Saurabh et al. |
| 9,710,322 | B2 | 7/2017 | Jewell et al. |
| 9,734,005 | B2 | 8/2017 | Ruan et al. |
| 9,772,898 | B2 | 9/2017 | Deshpande et al. |
| 9,811,795 | B1 | 11/2017 | Kearns et al. |
| 9,891,983 | B1 | 2/2018 | Dechiaro |
| 9,984,060 | B2 | 5/2018 | Bhattacharya et al. |
| 9,984,148 | B2 | 5/2018 | Lee et al. |
| 10,042,613 | B2 | 8/2018 | Castielli et al. |
| 10,042,697 | B2 | 8/2018 | Ahad |
| 10,083,073 | B2 | 9/2018 | Ambichl et al. |
| 10,120,747 | B2 | 11/2018 | Cunico et al. |
| 10,133,568 | B2 | 11/2018 | He et al. |
| 10,140,287 | B2 | 11/2018 | Dasgupta et al. |
| 10,140,576 | B2 | 11/2018 | Eldardiry et al. |
| 10,142,357 | B1 | 11/2018 | Tamersoy et al. |
| 10,162,696 | B2 | 12/2018 | Kogan-Katz et al. |
| 10,169,731 | B2 | 1/2019 | Brew et al. |
| 10,193,533 | B2 | 1/2019 | Chen et al. |
| 10,270,668 | B1 | 4/2019 | Thompson et al. |
| 10,303,533 | B1 | 5/2019 | Panov et al. |
| 10,318,541 | B2 | 6/2019 | Bingham et al. |
| 10,339,457 | B2 | 7/2019 | Ryckbosch et al. |
| 10,346,229 | B2 | 7/2019 | Tee et al. |
| 10,346,758 | B2 | 7/2019 | Natsumeda |
| 10,402,255 | B1 | 9/2019 | Niyogi |
| 10,467,318 | B2 | 11/2019 | Truitt et al. |
| 10,523,520 | B2 | 12/2019 | Aggarwal et al. |
| 10,552,289 | B2 | 2/2020 | Ilangovan et al. |
| 10,585,774 | B2 | 3/2020 | Chen et al. |
| 10,616,038 | B2 | 4/2020 | Kushmerick et al. |
| 10,628,747 | B2 | 4/2020 | Chen et al. |
| 10,637,745 | B2 | 4/2020 | Naous |
| 10,664,535 | B1 | 5/2020 | Hahn |
| 10,673,721 | B2 | 6/2020 | Hashimoto et al. |
| 10,701,096 | B1* | 6/2020 | Johnston ............... G06Q 10/20 |
| 11,347,622 | B1 | 5/2022 | Agarwal et al. |
| 2004/0249821 | A1 | 12/2004 | Nies et al. |
| 2011/0087924 | A1 | 4/2011 | Kandula et al. |
| 2011/0083123 | A1 | 5/2011 | Lou et al. |
| 2013/0124923 | A1 | 5/2013 | Wang et al. |
| 2014/0365575 | A1 | 12/2014 | Spaven et al. |
| 2016/0124823 | A1 | 5/2016 | Ruan et al. |
| 2016/0253229 | A1 | 9/2016 | Sade et al. |
| 2016/0307285 | A1 | 10/2016 | Gallagher |
| 2017/0013003 | A1 | 1/2017 | Samuni et al. |
| 2017/0228460 | A1 | 8/2017 | Amel et al. |
| 2018/0041500 | A1 | 2/2018 | Menahem et al. |
| 2018/0144041 | A1 | 5/2018 | Chen et al. |
| 2018/0211197 | A1 | 7/2018 | Vosseler et al. |
| 2018/0219723 | A1 | 8/2018 | Scarpelli et al. |
| 2018/0308001 | A1 | 10/2018 | Doddala et al. |
| 2018/0359530 | A1 | 12/2018 | Marlow et al. |
| 2019/0073257 | A1 | 3/2019 | Dasgupta et al. |
| 2019/0114244 | A1 | 4/2019 | Salunke et al. |
| 2019/0188286 | A1 | 6/2019 | Chan et al. |
| 2019/0250970 | A1 | 8/2019 | Gupta et al. |
| 2019/0356533 | A1 | 11/2019 | Vasseur et al. |
| 2019/0391863 | A1 | 12/2019 | Ofer et al. |
| 2020/0076841 | A1 | 3/2020 | Hajimirsadeghi et al. |
| 2020/0084085 | A1 | 3/2020 | Tucker et al. |
| 2020/0104775 | A1 | 4/2020 | Chintalapati et al. |
| 2020/0117668 | A1 | 4/2020 | Chamarajnagar |
| 2020/0142954 | A1 | 5/2020 | Mandalia et al. |
| 2020/0167350 | A1 | 5/2020 | Miller et al. |
| 2020/0201701 | A1 | 6/2020 | Wang et al. |
| 2020/0226362 | A1 | 7/2020 | Hu et al. |
| 2020/0380408 | A1 | 12/2020 | Sridhar et al. |
| 2021/0064500 | A1* | 3/2021 | Przestrzelski ....... G06F 11/3476 |
| 2021/0306361 | A1* | 9/2021 | Tanaka ............... H04L 63/1433 |
| 2021/0342313 | A1 | 11/2021 | Riddell |
| 2021/0382770 | A1 | 12/2021 | Lu et al. |

FOREIGN PATENT DOCUMENTS

| | | | |
|---|---|---|---|
| CN | 105577440 | B | 6/2019 |
| CN | 106293648 | B | 11/2019 |
| CN | 107248927 | B | 6/2020 |
| CN | 113434357 | A | 9/2021 |
| EP | 2863309 | B1 | 11/2018 |
| KR | 101328328 | B1 | 11/2013 |
| WO | 2015168141 | A1 | 11/2015 |
| WO | 2017020973 | A1 | 2/2017 |
| WO | 2017180666 | A1 | 10/2017 |
| WO | 2020023787 | A1 | 7/2019 |

OTHER PUBLICATIONS

Du, M. et al., "DeepLog: Anomaly Detection and Diagnosis from System Logs through Deep Learning," Session F2: Insights from Log(in)s CCS'17, Oct. 30-Nov. 3, 2017, Dallas, TX, USA, 14 pages.

Eldardiry et al.; "Multi-Source Fusion for Anomaly Detection: Using across-domain and across-time peer-group consistency checks", JoWUA Journal of, vol. 5, No. 2, pp. 39-58, Jun. 6, 2014.

Farschi et al.; "Anomaly Detection of Cloud Application Operations Using Log and Cloud Metric Correlation Analysis"; ISSRE IEEE 26th International Conference on, pp. 1-11, Nov. 2-5, 2016.

Gao et al.; "Modeling Probabilistic Measurement Correlations for . . . Distributed Systems", ICDCS IEEE 29th International Conference on, pp. 623-630, Jun. 22-26, 2009.

Leman Akoglu et al," Graph based Anomaly Detection and Description: A Survey." Data Mining and Knowledge Discovery, vol. 29, No. 3 (2015): pp. 1-68.

List of IBM Patents or Patent Applications Treated as Related; Appendix P; Date Filed: Jan. 19, 2021; 2 pages.

Madireddy et al.; "Analysis and Correlation of Application I/O Performance and System-Wide I/O Activity", Argonne National Laboratory, pp. 1-12, Apr. 2017.

Peiris et al.; "PAD: Performance Anomaly Detection in Multi-Server Distributed Systems", Cloud IEEE 7th International Conference on, pp. 769-776, Jun. 27-Jul. 2, 2014.

Peng et al.; "CM-GANs: Cross-Modal Generative Adversarial Networks for Common Representation Learning", Cornell University Library, arXiv:1710.05106v2,pp. 1-13,Apr. 26, 2018.

Song, Lei; "Informative Correlation Extraction From and for Forex Market Analysis", Auckland University of Technology, Master's Thesis, pp. 1-73, May 2010.

U.S. Appl. No. 17/110,432, filed Dec. 3, 2020, Entitled: Multi-Source Data Correlation Extraction for Anomaly Detection, First Named Inventor: Yuk L. Chan.

Yuk L. Chan et al., "Graph-Based Log Sequence Anomaly Detection and Problem Diagnosis," U.S. Appl. No. 17/110,535, filed Dec. 3, 2020.

Yuk L. Chan et al., "Integrating Documentation Knowledge With Log Mining for System Diagnosis," U.S. Appl. No. 17/110,430, filed Dec. 3, 2020.

U.S. Appl. No. 17/110,438, filed Dec. 3, 2020, Entitled: Correlation-Based Multi-Source Problem Diagnosis, First Named Inventor: Yuk L. Chan.

Yuk L. Chan et al., "Message Correlation Extration for Mainframe Operation," U.S. Appl. No. 17/110,431, filed Dec. 3, 2020.

Yuk L. Chan et al., "Message-Based Event Grouping for a Computing Operation ," U.S. Appl. No. 17/110,460, filed Dec. 3, 2020.

Yuk L. Chan et al., "Message-Based Problem Diagnosis and Root Cause Analysis," U.S. Appl. No. 17/110,458, filed Dec. 3, 2020.

(56) References Cited

OTHER PUBLICATIONS

Zhong et al.; "An Improved Correlation-Based Anomaly Detection Approach for Condition Monitoring Data of Industrial Equipment", ICPHM IEEE Inter. Conf. on, pp. 1-6, Jun. 20-22, 2016.
Metric Pair Log Frequency Correlation—Google Scholar/Patents search—text refined (year: 2022).

* cited by examiner

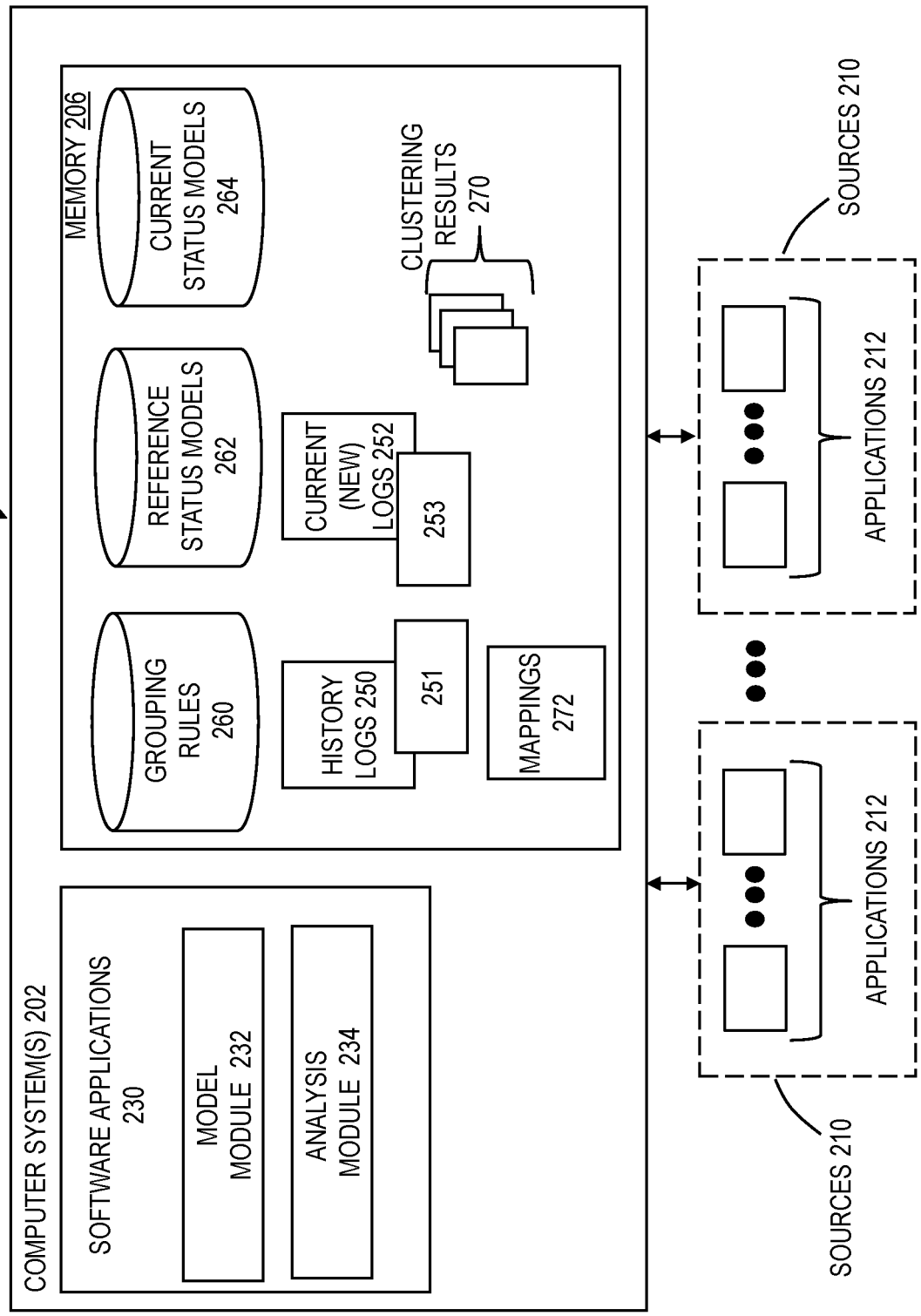

FIG. 3

ONLINE PROCESS

- 322: COLLECT CURRENT LOGS FROM DISTRIBUTED APPLICATIONS
- 324: GROUP LOGS FROM RELATIVE SOURCES BASED ON GROUPING RULES
- 326: EXTRACT FEATURES FROM GROUPED LOGS WITH TIME SPAN OF SELECTED WINDOWS
- 328: USE TRAIN MODELS TO GENERATE CLUSTERING RESULTS FOR SELECTED TIME WINDOWS
- 330: ALIGN TIME WINDOW MODELS WITH APPLICATION'S TIME-SERIES PATTERN
- 332: ANALYZE THE CURRENT STATUS WITH THE REFERENCE STATUS
- 334: PERFORM PROBLEM DIAGNOSIS AND ANOMALY DETECTION

OFFLINE PROCESS

- 302: COLLECT HISTORY LOGS FROM DISTRIBUTED APPLICATIONS
- 304: GROUP LOGS FROM RELATIVE SOURCES BASED ON GROUPING RULES
- 306: EXTRACT FEATURES FROM GROUPED LOGS WITH TIME SPAN OF SELECTED WINDOWS
- 308: TRAIN MODELS WITH SELECTED TIME WINDOWS
- 310: ALIGN TIME WINDOW MODELS WITH APPLICATION'S TIME-SERIES PATTERN

262: REFERENCE STATUS MODELS

300

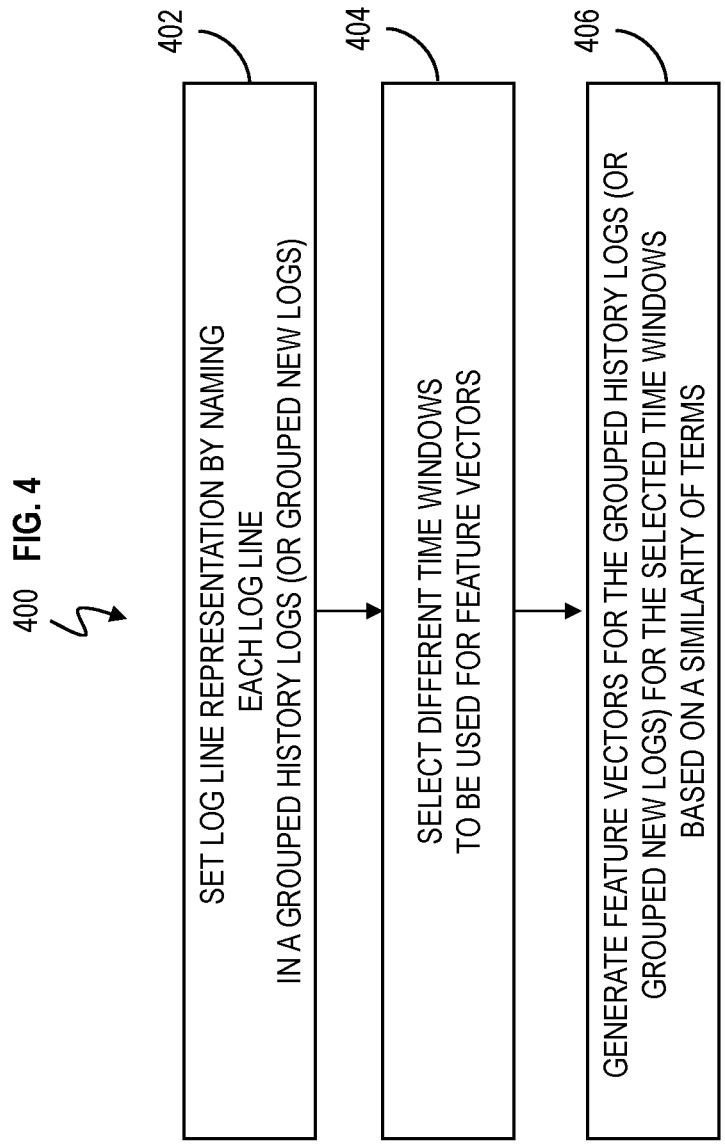

FIG. 5

FEATURE VECTOR (60 MINUTE TIME WINDOW)

FIG. 7

CLUSTERING RESULTS OF 30 MINUTE WINDOW

| HALF HOURS OF DAY: | 1 25 | 2 26 | 3 27 | 4 28 | 5 29 | 6 30 | ... | 15 40 | 16 41 | 17 42 | 18 43 | 19 44 | 20 45 | 21 46 | 22 47 | 23 | 24 48 |
|---|---|---|---|---|---|---|---|---|---|---|---|---|---|---|---|---|---|
| DAY 1 | 0 0 | 0 0 | 0 0 | -1 0 | 0 0 | 0 0 | ... | 0 0 | 0 0 | 0 0 | 0 0 | 0 0 | 0 0 | 0 0 | 0 0 | 0 | 0 0 |
| DAY 2 | 0 0 | 0 0 | -1 0 | 2 0 | 0 0 | 0 0 | ... | 0 -1 | 0 0 | 0 0 | 0 0 | 0 0 | 0 0 | 0 0 | 0 0 | 0 | 0 0 |
| ... | | | | 2 0 | 0 0 | 0 0 | ... | 0 0 | 0 0 | 0 0 | 0 0 | 0 0 | 0 0 | 0 0 | 0 0 | 0 | 0 0 |
| DAY 6 | 0 0 | 0 0 | 2 0 | 0 0 | 0 0 | ... | 0 0 -1 -1 | 0 0 | 0 0 | 0 0 | 0 0 | 0 0 | 0 0 | 0 0 | 0 | 0 0 |

CLUSTER LABEL, CLUSTER LABEL, ANOMALIES, CLUSTER LABEL

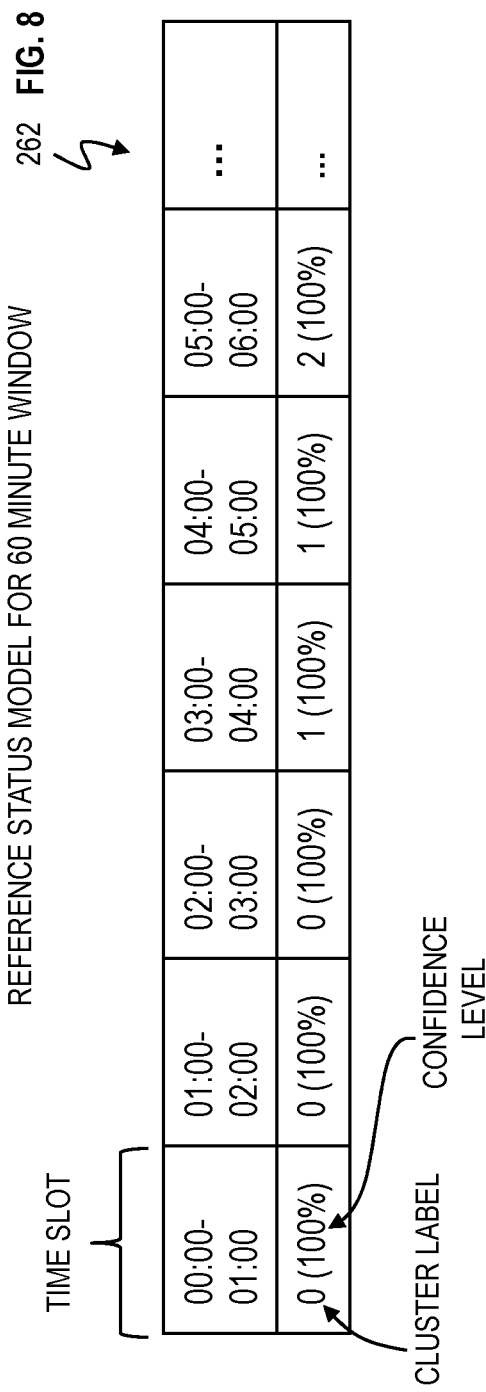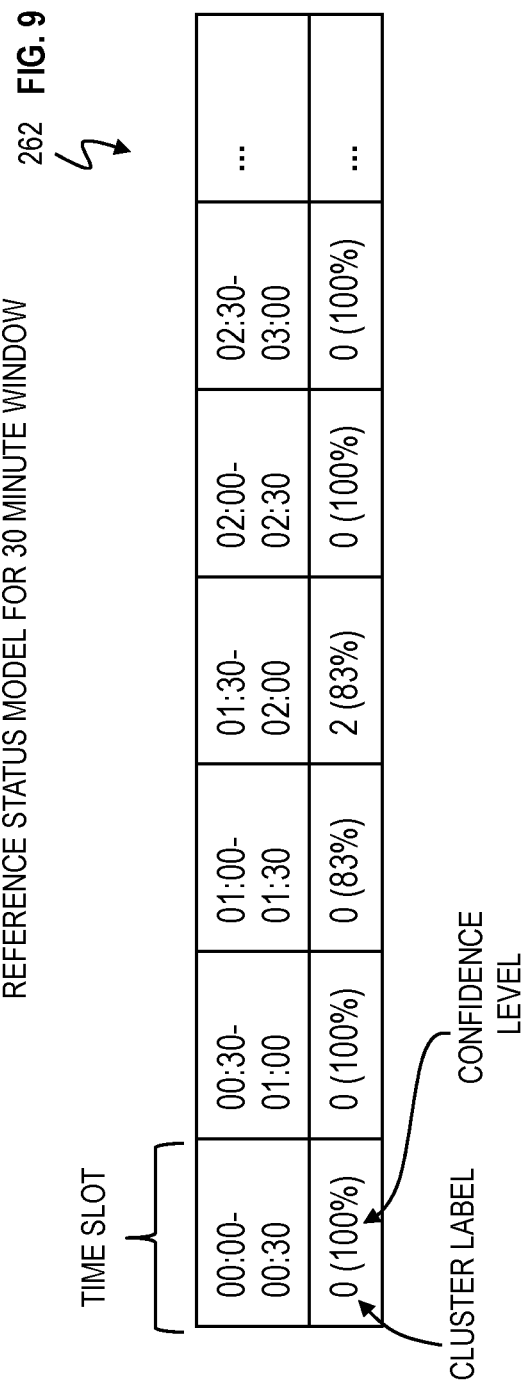

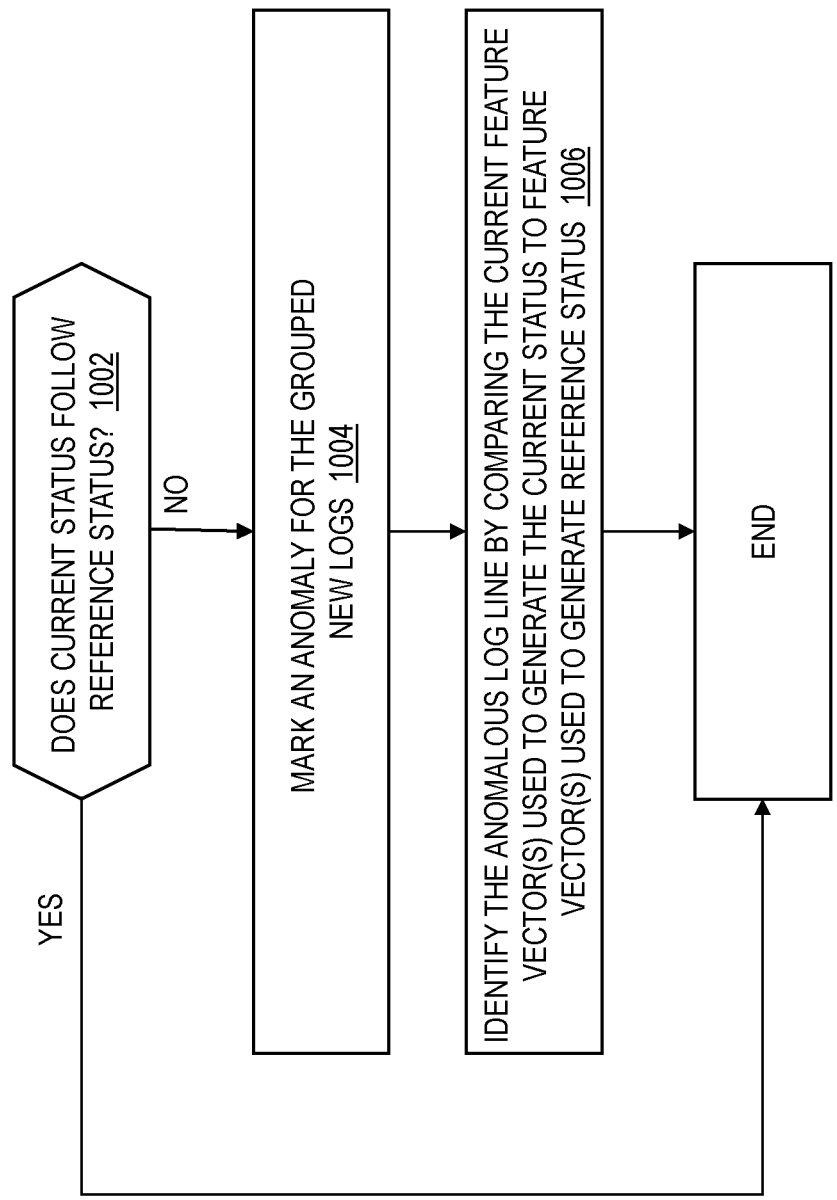

FIG. 11

APPLICATION'S CURRENT STATUS REPRESENTED BY A FEATURE VECTOR

APPLICATION'S REFERENCE STATUS MODEL'S FEATURE VECTOR

FIG. 13

CURRENT STATUS'S DIFFERENCE WITH THE REFERENCE STATUS

LOG-BASED STATUS MODELING AND PROBLEM DIAGNOSIS FOR DISTRIBUTED APPLICATIONS

BACKGROUND

The present invention generally relates to computer systems, and more specifically, to computer systems, computer-implemented methods, and computer program products for performing log-based log status modeling and problem diagnosis for distributed applications.

In computing, syslog is a standard for message logging, generally referred to as logs. Syslog allows separation of the software that generates messages, the system that stores the messages, and the software that reports and analyzes the messages. Each message is labeled with a facility code, indicating the software type generating the message, and is assigned a severity level. Computer system designers may use syslog for system management and security auditing as well as general informational, analysis, and debugging messages. A wide variety of devices, such as printers, routers, and message receivers across many platforms use the syslog standard. This permits the consolidation of logging data from different types of systems in a central repository. Implementations of syslog exist for many operating systems.

SUMMARY

Embodiments of the present invention are directed to performing log-based application status modeling and problem diagnosis for distributed applications. A non-limiting example computer-implemented method includes collecting current logs from distributed sources, selecting a group of the current logs that are from a related source of the distributed sources, and generating a feature vector using the group of the current logs. The computer-implemented method includes creating a current status model for the feature vector using the group of the current logs and determining one or more anomalies in the group of the current logs based on a difference between the current status model and a reference status model, the reference status model being based on history logs.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 2 depicts a block diagram of a system for performing log-based log status modeling and problem diagnosis for distributed applications from different sources in accordance with one or more embodiments of the present invention;

FIG. 3 depicts a block diagram of an example flowchart for performing log-based log status modeling and problem diagnosis for distributed applications in accordance with one or more embodiments of the present invention;

FIG. 4 depicts an example flowchart of transforming grouped and time-windowed raw logs into features for feature vectors in accordance with one or more embodiments of the present invention;

FIG. 5 depicts an example of a single feature vector for a 60 minute time window in accordance with one or more embodiments of the present invention;

FIG. 7 depicts example clustering results for a 30 minute time window in accordance with one or more embodiments of the present invention;

FIG. 8 depicts an example reference status model for a 60 minute window in accordance with one or more embodiments of the present invention;

FIG. 9 depicts an example reference status model for a 30 minute window in accordance with one or more embodiments of the present invention;

FIG. 10 depicts a flowchart for determining anomalous log lines in grouped new logs in accordance with one or more embodiments of the present invention;

FIG. 11 depicts an example feature vector of a current status model for grouped new logs for an application and/or type of application in accordance with one or more embodiments of the present invention;

FIG. 13 depicts the difference between the feature vectors of the current status model and the reference status model in accordance with one or more embodiments of the present invention;

DETAILED DESCRIPTION

One or more embodiments of the present invention are configured to perform problem diagnoses for distributed applications using log-based status modeling. A system can model logs from distributed sources for distributed applications with their spatial and temporal context information included. Using the spatial and temporal context information for the distributed applications, the system can provide model-based problem diagnosis and other artificial intelligence for IT operations (AIOps).

According to one or more embodiments, the system collects information for log grouping which can be from third party systems or manual input and transforms the information according to log grouping rules. Based on grouping rules, the system groups the logs from the distributed sources to a single stream and processes the stream into slices with multiple time windows. The system conducts a machine learning/modeling process on the slices in order to model the behavior of the processed distributed logs in their spatial and temporal context. The system aligns the time window models with application's time-series pattern for the grouped logs in order to construct the application's reference status model. Based on the above time window model, the system determines the application's current status for the current time window and finds its difference with the reference model, thereby performing problem diagnoses using grouped logs from different sources related to the same distributed application.

Figure 1:
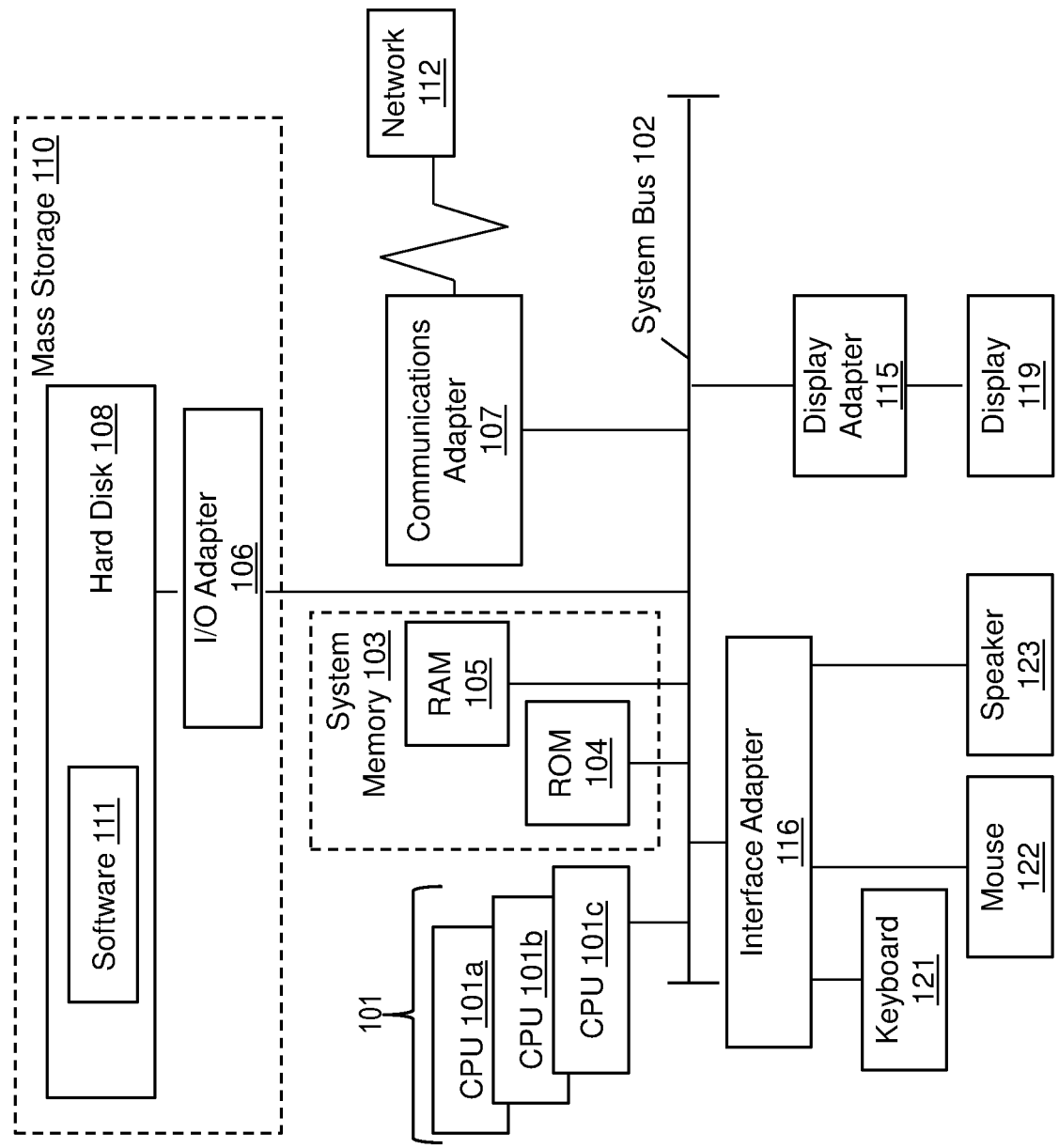
FIG. 1 depicts a block diagram of an example computer system for use in conjunction with one or more embodiments of the present invention.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

FIG. 2 is a block diagram of a system 200 for performing log-based log status modeling and problem diagnosis for distributed applications from different sources in accordance with one or more embodiments of the present invention. FIG. 2 depicts one or more computers systems 202 coupled to one or more sources 210 via a wired and/or wireless network. Sources 210 can be distributed sources. Sources 210 can include one or more computer systems, storage (memory) devices, etc. For example, computer system 202 can be representative of numerous computers in a datacenter servicing various users, and sources 210 can be representative of numerous computers in one or more datacenters servicing various institutions or businesses including banks, companies, universities, etc. Elements of computer system 100 may be used in and/or integrated into computer systems 202 and sources 210 (e.g., computer systems). One or more software applications 230, model modules 232, and analysis modules 234 may utilize and/or be implemented as software 111 executed on one or more processors 101, as discussed in FIG. 1. Also, software applications 212 may utilize and/or be implemented as software 111 executed on one or more processors 101, as discussed in FIG. 1. There are many jobs running on sources 210 (e.g., computer systems) and even computer system 202, for example, z/OS® system. Jobs can also be referred to as workloads. It is impossible for a system programmer to know the details of each job. If a job fails, the system programmer will need to look through the log messages for a possible root cause; however, being unfamiliar with the job makes this a daunting task. According to one or more embodiments, computer system 202 uses log-based status modeling to perform problem diagnosis for distributed applications, such as software applications 212.

FIG. 3 is a block diagram of an example flowchart 300 for performing log-based log status modeling and problem diagnosis for distributed applications in accordance with one or more embodiments of the present invention. The flowchart 300 will be described with reference to FIG. 2. FIG. 3 illustrates analogous details performed for both history logs 250 and new logs 252, which can be stored in memory 206. At block 302, software applications 230 of computer system 202 are configured to collect history logs 250 from distributed software applications 212 from one or more sources 210 (e.g., computer systems). History logs 250 may be from one source 210 and/or various sources 210. History logs 250 and new logs 252 can be received by computer system 202 from numerous sources 210 including computer systems for processing job or workloads as discussed herein. Some of history logs 250 and new logs 252 may be from computer system 202. History logs 250 and new logs 252 can be mainframe syslogs or logs which describe a standard for message logging. One or more of computer systems 202 and/or sources 210 can be representative of mainframes, servers, etc., for processing numerous jobs. History logs 250 and new logs 252 can each contain hundreds, thousands, and/or millions of lines/pieces of data, also referred to as "big data". As such, the number of jobs being processed and their corresponding history logs and new logs are too numerous to be done/processed/performed in the human mind.

History logs 250 and new logs 252 are the raw text and/or raw textual logs for jobs or workloads performed on the sources 210, for example, by one or more computer systems. History logs 250 and new logs 252 each include log lines, where a log line contains information for a job or workload. An individual log line is a log of what occurred for a job or workload that is being processed. A few example fields of a log line in history logs 250 and new logs 252 may include Message)Index, System Name, timestamp/time, Job_Identification (ID), MPF flags, Message_ID, Message_Text, etc.

A job or workload is action performed by a computer system, and a computer system can be tasked to perform various jobs at different times. Example jobs can include a job to backup a server, a job to update an email server, a job to migrate memory, etc.

At block 304, software applications 230 of computer system 202 are configured to group history logs 250 from relative sources 210 based on grouping rules 260. Software applications 230 can generate different sets of grouped history logs, and an example set is represented as grouped history logs 251. For example, there can be numerous log lines in history logs 250, and a set of log lines of history logs 250 are grouped together for subsequent processing from different sources 210 in preparation to form the entity to be modeled as discussed further herein. By applying grouping rules 260 to find related sources 210, software applications 230 are configured to parse log lines of history logs 250 and group the log lines of history logs 250 based on any of the following: sources 210 in the same middleware, sources 210 from the same application, sources 210 that share the same resource, sources 210 that belong to the same client, etc. For explanation purposes, software application 212 could be representative of the same middleware, the same software application, the same resource which in this case could be a shared software component, shared hardware component (e.g., memory, processor, data storage), or both shared software and hardware components, the same client, etc. In some cases, grouping rules 260 can have a larger grouping scope than noted above, and a larger grouping scope captures more variances but decreases the model's accuracy. A larger grouping scope could be, for example, grouping the sources 210 by mainframe, type of open platform, etc.

Additionally, grouping rules 260 can have an automatic configuration, a manual configuration, and/or both. As an automatic configuration for grouping log lines of history logs 250, software applications 230 are configured to group sources 210 using workload declarations, topology discovery results, configuration management database (CMDB) records, etc. Modern cloud platforms, like IBM® Kubernetes, use text (usually in yaml format) declaration to deploy workloads. An application's topology is defined in these declarations. There are many available tools, like IBM® TADDM, IBM® Netcool® ASM, etc., that detect an application's static or dynamic topology. The outputs of these tools are topology discovery results.

As an example scenario used for explanation purposes, a commercial bank with different branches may have history logs 250 grouped by the bank's core application. After grouping by the bank's core application (e.g., software application 230), there can be grouped history logs 251 having been grouped together because of related sources which are customer information control system (CICS) application regions and CICS CICSplex system manager (CPSM). CICS is a family of mixed language application servers that provide online transaction management and connectivity for applications on IBM® mainframe systems under z/OS® and z/VSE®.

At block 306, software applications 230 of computer system 202 are configured to extract features from the grouped logs, for example grouped history logs 251, using a time space of selected windows and use these extracted features to create feature vectors. Performing feature extraction to generate feature vectors of block 306 is further explained in process 400 in FIG. 4, where the process 400 transforms the grouped and time-windowed raw logs into features for feature vectors. For explanation purposes, one of the features of the grouped history logs 251 may include message identifications (e.g., Message_IDs), and it should be appreciated other features may be included in the feature vectors. The process 400 includes log line representation, window selections, and feature extraction. During log line representation at block 402, software applications 230 are configured to set a log line representation for each log line in the grouped history logs (e.g., grouped history logs 251 and analogously for grouped new logs 253) by naming each log line. For example, software applications 230 can perform the concatenation of a source name and log signature for each log line in the grouped history logs (e.g. grouped history logs 251). Example source names may include host name (e.g., System Name), container name, etc. Example log signatures may include message identification (e.g., Message_ID), regular expression (e.g., regex), etc. For illustration purposes, and not limitation, the example log line representation can be the concatenation as follows System_Name-Message_ID where each log line has its own System_Name-Message ID also referred to as a system name-message ID pair. Returning to the example scenario for the commercial bank, examples of the log line representation of two log lines (of grouped history logs 251) can include CICS region: CIOXXXX2-DFHAP1900 and/or CICS CPSM: EYUXXXX4-EYUPN0011W.

During window selection at block 404, software applications 230 are configured to select one or more different time windows to be used for feature vectors. For example, software applications 230 perform time window selection for the grouped history logs (e.g., grouped history logs 251 and analogously for grouped new logs 253) where example (predefined) time window selection settings may include a 10 minute time window, 30 minute time window, 60 minute time window, etc., and any other time windows can be selected. Multiple time windows are selected to balance the model's timeliness and robustness. A larger time window reduces the model's timeliness but increases robustness, and vice versa. Accordingly, one or more embodiments allow users to select different time windows to meet their requirements. During feature extraction to generate feature vectors at block 406, software applications 230 are configured to generate feature vectors for the grouped history logs (e.g., grouped history logs 251 and analogously for grouped new logs 253) for the selected time window based on a similarity of terms/features. For example, software applications 230 can identify the terms/features in each log line in the selected time window and determine the similarity between terms/features of the log lines for the selected time window. As an example, and not limitation, the terms/features can be message identifications (e.g., Message IDs) which are included in each log line. Software applications 230 can employ various techniques to determine similarity among terms/features, including but not limited to term frequency-inverse document frequency (TF-IDF or TFIDF), word embedding, etc. TF-IDF is a numerical statistic that is intended to reflect how important a feature/term is to a document in a collection or corpus. It may be used as a weighting factor in searches of information retrieval, text mining, and user modeling. The TF-IDF value of a feature/term increases proportionally to the number of times that feature/term appears in the document.

According to one or more embodiments, the TF-IDF value is the term value for the similarity of the feature/term, for example, message ID (e.g., Message_ID), in the log lines of the grouped history logs for the selected time window. The message ID is usually an alphanumeric number. For history logs 250 and new logs 252, there are a predetermined number of types of message IDs, corresponding to a predetermined number of features/terms, where each feature/term has its own designated location or column in the feature vector, regardless of the time window. For example, each feature vector is predetermined to have, for example, Y columns, where each column is unique to a specific type of message ID. If it is assumed that there are 545 columns, for example purposes, this means that there could be a total of 545 different types of possible message IDs (i.e., features/terms) searched for in the log lines of the grouped history logs during feature extraction. After determining the similarity for message IDs of log lines for the grouped history logs in the selected time window, the software applications 230 are configured to generate the feature vector for the selected time window with a feature value (e.g., frequency) in each designated column (i.e., each feature/term column related to a message ID). In short, each column in the feature vector represents a type of message ID and a feature value of a column is the frequency of a specific message ID in the log lines of the grouped history logs (e.g., grouped history logs 251 and analogously for grouped new logs 253).

Figure 5:
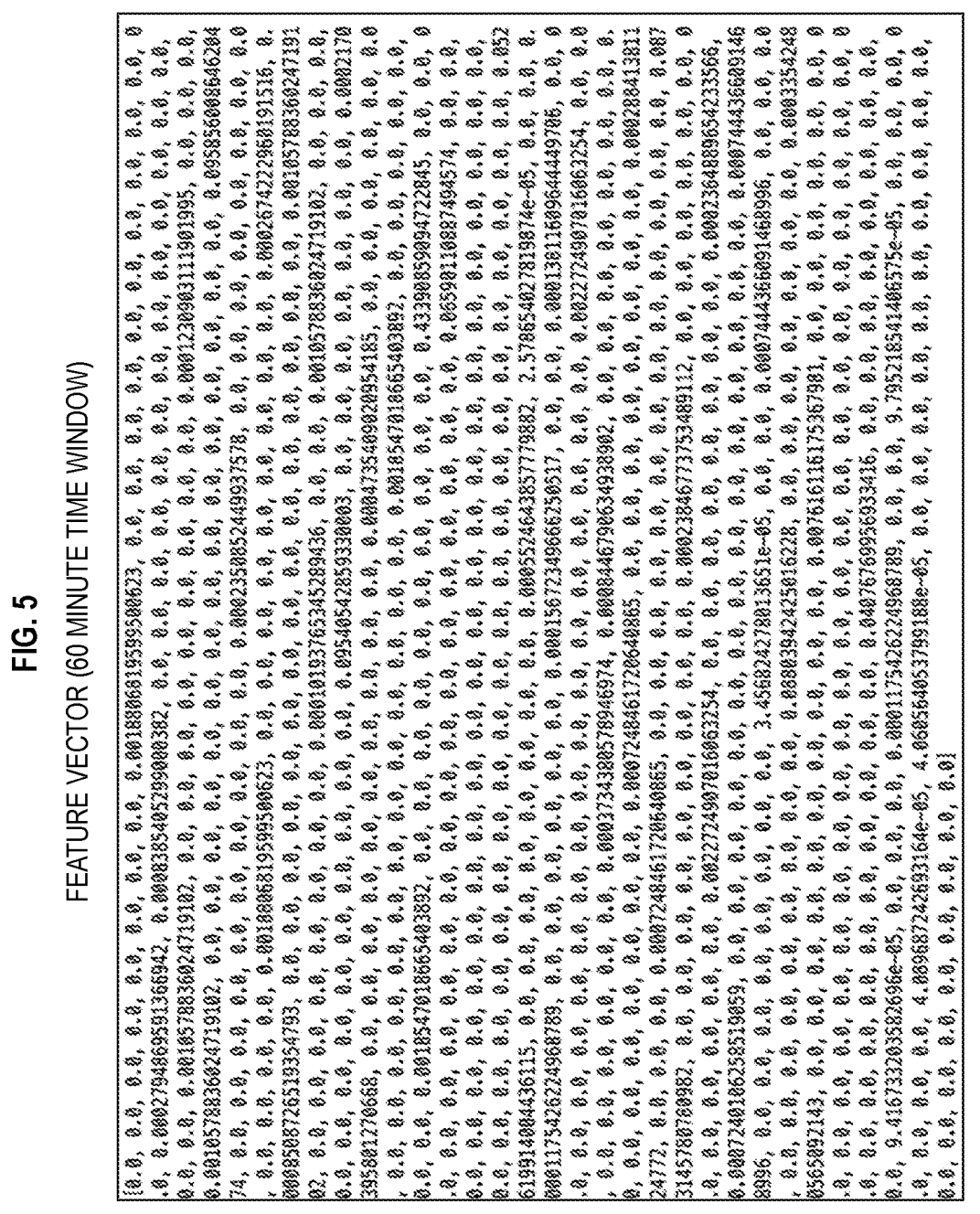

FIG. 5 depicts an example of a single feature vector based on TF-IDF for a 60 minute time window according to one or more embodiments of the invention. Not only is block 306 performed for each selected time window (60 minute, 30 minute, 10 minute, etc.) for the (same) grouped history logs, feature extraction is performed for other grouped history logs of history logs 250. For the grouped history logs (e.g., grouped history logs 251 and analogously for grouped new logs 253), there are feature vectors for each of the different time windows with Y number of columns, and some time windows will have more than one feature vector. Because there are 60 minutes in an hour, a time window of 60 minutes has only one feature vector for the grouped history logs in this example. A time window of 30 minutes has two feature vectors for the grouped history logs, and time window of 10 minutes has six feature vectors for the same grouped history logs. In this way, the same grouped history logs (e.g., grouped history logs 251 and analogously for grouped new logs 253) can be analyzed with different levels of granularity. As one example scenario, for the 60 minute time window, the feature vector for grouped history logs has 140 rows and 545 columns. For the 30 minute time window, the feature vector for the grouped history logs has 280 rows and 545 columns, where the 30 minute window has twice as many rows as the 60 minute window. For the 10 minute time window, the feature vector for the grouped history logs has 840 rows and 545 columns, where the 10 minute time window has three times as many rows as the 30 minute window.

Referring back to FIG. 3, at block 308, software applications 230 of computer system 202 are configured to train models according to selected time windows, and the trained models are used to generate clustering results 270. Software applications 230 cluster the time windowed features (such as the features/terms) of the feature vectors using a model module 232. Model module 232 can use and/or implement a clustering algorithm. An example clustering algorithm that can be used is density-based spatial clustering of applications with noise (DBSCAN), and the DBSCAN can use cosine distance measurement. Although DBSCAN is discussed as an example, various techniques can be used for clustering detection such as, for example, density-based techniques (k-nearest neighbor, local outlier factor, isolation forests, etc.), subspace-based, correlation-based, and tensor-based outlier detection, one-class support vector machines, long short-term memory neural networks, Bayesian networks, hidden Markov models (HMMs), cluster analysis-based outlier detection, etc. Through learning, which may be supervised or unsupervised, model module 232 can label (or classify) the features/terms in the feature vector of the grouped history log for the time window. As input to model module 232, the feature vectors are input which represent grouped history logs (e.g., grouped history logs 251 and analogously for grouped new logs 253) from distributed sources 210 in a time window sequence. As output from model module 232, cluster labels are output which indicate different types of statuses and/or behaviors for the applications corresponding to the feature vectors, and noise points (e.g., cluster labels having a "−1") are considered as anomalies and further investigated.

Figure 6:
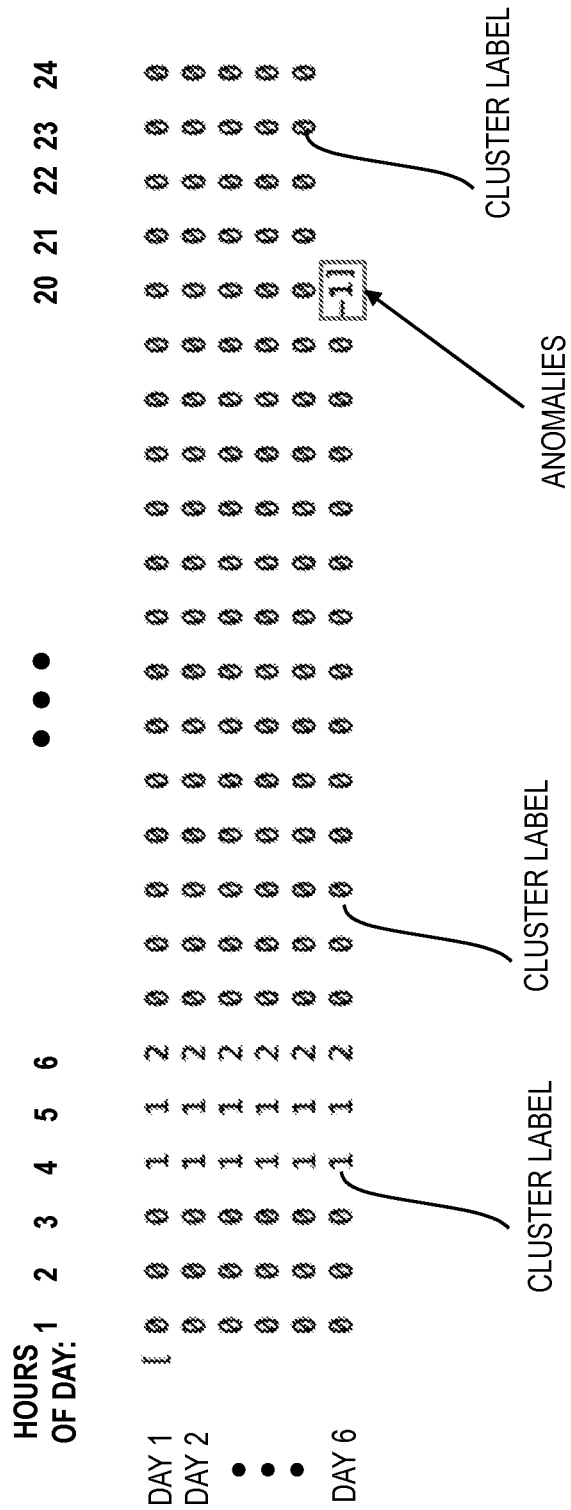
FIG. 6 depicts example clustering results for a 60 minute time window in accordance with one or more embodiments of the present invention.

As example output of model module 232 of software applications 230, FIG. 6 depicts example clustering results (e.g., cluster results 270) for a 60 minute time window according to one or more embodiments of the invention. The clustering results for a 60 minute time window uses six 10 minute feature vectors as the input to the model module 232. The 24 columns each represent one hour of the day. The six rows are six days. The value of the numbers is each a cluster label or cluster ID, and the cluster label defines types of statuses and/or behaviors of applications as noted above. Examples of different types of statuses and/or behaviors include but are not limited to the following: the change of a specific log message's frequency, like a burst or a decrease; the presence of specific log messages which are not expected by the model; and the absence of specific log messages which are expected by the model. Each cluster label is at a given hour of the day on a given day, and the cluster labels are related to message IDs of the log lines in the grouped history logs. After clustering, the group of message IDs are labeled by the algorithm (e.g., model module 232). The label indicates the type of status for this group of message IDs. A noise point is an anomaly and has to be further investigated as discussed herein. An example anomaly is highlighted on hour 20 day 6 in FIG. 6. The cluster label "−1" identifies an anomaly at a certain hour of the day. In short, software applications 230 have detected a problem on sources 210 (e.g., computer systems) for a given application 212, thereby detecting a software problem which affects the functioning of a computer.

FIG. 7 depicts example clustering results (e.g., cluster results 270) for a 30 minute time window according to one or more embodiments of the invention. The clustering results for a 30 minute time window use two 10 minute feature vectors as the input to the model module 232. FIG. 7 still has 24 columns representing 24 hours of the day but illustrates 12 days instead of the six days shown in FIG. 6 (for 60 minute window). FIG. 7 illustrates cluster labels for the same six day's data. In FIG. 7, there are 24 columns, each column represents 30 minutes. Therefore, two rows in combination represent a day. Although clustering results 270 for a 10 minute time window are not shown, it should be appreciated that there would be six rows 10 minutes each for six days while the columns still represent 24 hour days.

Referring back to FIG. 3, at block 310, software applications 230 of computer system 202 are configured to align the time window models/clusters (i.e., clustering results 270) with the application's time series pattern according to one or more embodiments of the invention. Software applications 230 are configured to generate reference status models 262 for each of the selected time windows for the grouped history logs (e.g., grouped history logs 251 and analogously for grouped new logs 253) using the clustering results 270. Different grouped history logs of history logs 250 are labeled for various time windows (e.g., 10, 30, 60, etc.), and after processing their respective feature vectors using model module 232, their clustering results 270 are utilized to generate corresponding reference status models 262. For example, clustering results 270 of a 10 minute time window are used to generate a reference status model 262 for a 10 minute time window. Similarly, clustering results 270 of a 30 minute time window are used to generate a reference status model 262 for a 30 minute time window. Likewise, clustering results 270 of a 60 minute time window are used to generate a reference status model 262 for a 60 minute time window.

FIG. 8 depicts an example reference status model 262 for a 60 minute window according to one or more embodiments of the invention. FIG. 9 depicts an example reference status model 262 for a 30 minute window according to one or more embodiments of the invention. When building reference status models 262, one day (i.e., 24 hours) is defined as a cycle. Each reference status model 262 has time slots that fit the time window of the underlying feature vector upon which the reference status model 262 is built, and the application's status is denoted by cluster labels with their confidence interval. For example, FIG. 8 illustrates one hour time slots for a 24 hour day because its reference status model 262 is for a 60 minute window, and within each time slot, there is a corresponding cluster label and confidence level for that cluster label. Analogously, FIG. 9 illustrates 30 minute time slots for a 24 hour day because its reference status model 262 is for a 30 minute window, and within each time slot, there is a corresponding cluster label and confidence level for that cluster label. A confidence level of 100% indicates that there is 100% confidence in the associated cluster label for the corresponding time slot.

In discussing FIG. 3, it was noted that analogous processing occurs for both history logs 250 as the offline process and new logs 252 as the online process, and the flow for new logs 252 will be discussed. When processing new logs 252, software applications 230 of computer system 202 are configured to perform blocks 322, 324, 326, 328, 330 which are analogous to blocks 302, 304, 306, 308, 310 as previously discussed herein, and blocks 322, 324, 326, 328, 330 will only be discussed briefly for new logs 252.

At block 322 which is analogous to block 302, software applications 230 of computer system 202 are configured to collect new logs 252 from distributed applications 212 from one or more sources 210 (e.g., computer systems). New logs 252 may be from one source 210 and/or various sources 210 including computer systems for processing job or workloads as discussed herein. At block 324 which is analogous to block 304, software applications 230 of computer system 202 are configured to group new logs 252 from relative sources 210 based on grouping rules 260. Software applications 230 can generate different sets of grouped new logs, and an example set is grouped new logs 253 (e.g., analogous to discussions for grouped history logs 251). For example, there can be numerous log lines in new logs 252 and a set of log lines of new logs 252 is grouped together for subsequent processing from different sources 210 in preparation to form current status models 264 as discussed further herein. By applying grouping rules 260 to find related sources 210 (e.g., the same application 212), software applications 230 are configured to parse log lines of new logs 252 and group the log lines of new logs 250 based on any of the following: sources 210 in the same middleware, sources 210 from the same application, sources 210 that share the same resource, sources 210 that belong to the same client, etc.

At block 326 which is analogous to block 306, software applications 230 of computer system 202 are configured to extract features from the grouped logs, for example grouped new logs 253, using a time space of selected windows and use these extracted features to create feature vectors. It should be appreciated that performing feature extraction to generate feature vectors discussed in FIG. 4 applies by analogy to grouped new logs 253 for new logs 252, and accordingly, the discussion of FIG. 4 is not repeated for the sake of brevity. At block 328 which is analogous to discussions for block 308 with the exception of having to train model module 232 because model module 232 has been previously trained, software applications 230 of computer system 202 are configured to use trained models to generate clustering results 270 for grouped new logs 253 of new logs 252. Software applications 230 cluster the time windowed features of the feature vectors using trained model module 232. For new logs 252, the feature vectors are input which represent grouped new logs from distributed sources 210 in a time window sequence. As output, cluster labels are output which indicate different types of statuses and/or behaviors for the applications corresponding to the feature vectors. Clustering results in FIGS. 6 and 7 can be representative of clustering results 270 of grouped new logs 253.

Referring to FIG. 3, at block 330 which is analogous to block 310, software applications 230 of computer system 202 are configured to align the time window models/clusters (i.e., clustering results 270) with application's time series pattern according to one or more embodiments of the invention. Software applications 230 are configured to generate current status models 264, which are analogous to reference status models 260, for each of the selected time windows for the grouped new logs using the clustering results 270 for the grouped new logs (e.g., grouped new logs 253). Different grouped new logs of new logs 252 are labeled for various time windows (e.g., 10, 30, 60, etc.), and after processing their respective feature vectors using model module 232, their clustering results 270 for the grouped new logs are utilized to generate corresponding current status models 264 to eventually be compared against their counterpart reference status models 262. The example reference status models in FIGS. 8 and 9 are analogous to corresponding current status models 264 for grouped new logs 253 but without the confidence level. The confidence levels were statistically determined after training using training data (i.e., historical logs).

At block 332, software applications 230 of computer system 202 are configured to analyze a current status model 264 for the grouped new logs (e.g., grouped new logs 253) with a reference status model 262 for grouped history logs (e.g., grouped history logs 251) for the same time window (e.g., both the current status model being analyzed and the reference status model are for a 60 minute window) in order to determine one or more anomalous log lines in the grouped new logs of new logs 252. The same analysis applies for other time windows. According to one or more embodiments, FIG. 10 is a flowchart 100 of further details of determining the anomalous log lines in the grouped new logs. At block 1002, software applications 230 determines whether current status model 264 follows the corresponding reference status model 262 for the same time window (e.g., 60 minute time window). In one or more embodiments, software applications 230 may utilize the same clustering algorithm as used before or a different clustering algorithm to compare the values of cluster labels in current status model 264 to the values of cluster labels in reference status model 262 for the corresponding time slots. If "Yes" the values of the current status model and reference status models are the same, the flow ends.

If "No", software applications 230 determines that one or more anomalies are detected at block 1004. For example, the detection of the anomalies along with the identified grouped new logs can be displayed to the software programmer or debugger. At block 1006, software applications 230 are configured to identify one or more anomalous log lines in the grouped new logs (e.g., grouped new logs 253) by comparing the current feature vector(s) used to generate current status model 264 to the feature vector(s) used to generate reference status model 262 having the largest confidence level, thereby pinpointing the anomalous log lines in the grouped new logs.

FIG. 11 depicts an example feature vector of the current status model for grouped new logs (e.g., grouped new logs 252) for an application or type of application (e.g. application 212) according to one or more embodiments. In FIG. 11, the example feature vector corresponds to and was used to generate the current status model 264 (e.g., for a 60 minute time window) for grouped new logs 253 of new logs 252, where the current status model 264 does not match or follow reference status model 262 for the same time window and same application.

Figure 12:
FIG. 12 depicts an example feature vector for a reference status model that is compared to the feature vector of the current status model in accordance with one or more embodiments of the present invention.

FIG. 12 depicts an example feature vector for the reference status model (e.g., reference status model 262) (for the same time window and same application) that is compared to the feature vector of the current status model according to one or more embodiments.

FIG. 13 depicts the difference between the feature vectors of the current status model (e.g., current status model 264) and the reference status model (e.g., reference status model 262). For example, the top five systems and message IDs (system name-message ID pairs) who cause the difference from the reference status model are the following: CIOXXXX2-DFHAP1900; CIOXXXX2-DFHUS0200; EYUXXXX4-EYUPN0011W; EYUXXXX4-EYUPN0005W; and CIOXXXX4-DFHUS0200. In one or more embodiments, element-wise subtraction is performed as feature vector comparison. The differences between the feature vectors of the current status model (e.g., current status model 264) and the reference status model (e.g., reference status model 262) are respectively ranked (from greatest to least, or vice versa) and stored. If the subtraction difference is greater, this means the current status for a feature vector deviates from the reference status model (normal behavior) larger, and vice versa. Mappings 272 is an element-wise mapping from message IDs to feature vectors. Using the mappings 272, software applications 230 can perform tracing back to the specific system name-message ID pairs having the problems.

Returning to FIG. 3, at block 334, software applications 230 of computer system 202 are configured to perform problem diagnosis and anomaly detection. Using the system name-message ID pairs that caused the anomalies (i.e., problems), software application 230 further diagnosis the anomalies/problem and/or can use debugging software to further diagnose the anomalies/problems. For example, software application 230 may determine that the anomalies/problems are in hardware components (e.g., processors, memory, caches, registers, I/O connectors, etc.) and/or software components (e.g., software applications, operating systems, protocols, backup software applications, etc.) for each respective system name-message ID pair.

Technical advantages and benefits include one or more embodiments that perform log-based log status modeling and problem diagnosis for distributed applications. Rather than ignoring useful content information, techniques incorporate spatial information and temporal information. For spatial information, techniques combine logs from different but related sources, thereby using a distributed application topology. For temporal information, techniques model the application's behavior with multiple time windows, which can include a time span for a transaction to a time span for a long batch job. One or more embodiments leverage the workload's or job's time-series patterns by characterizing logs in the cycle and making informative diagnoses based on the log characteristic comparison.

Figure 14:
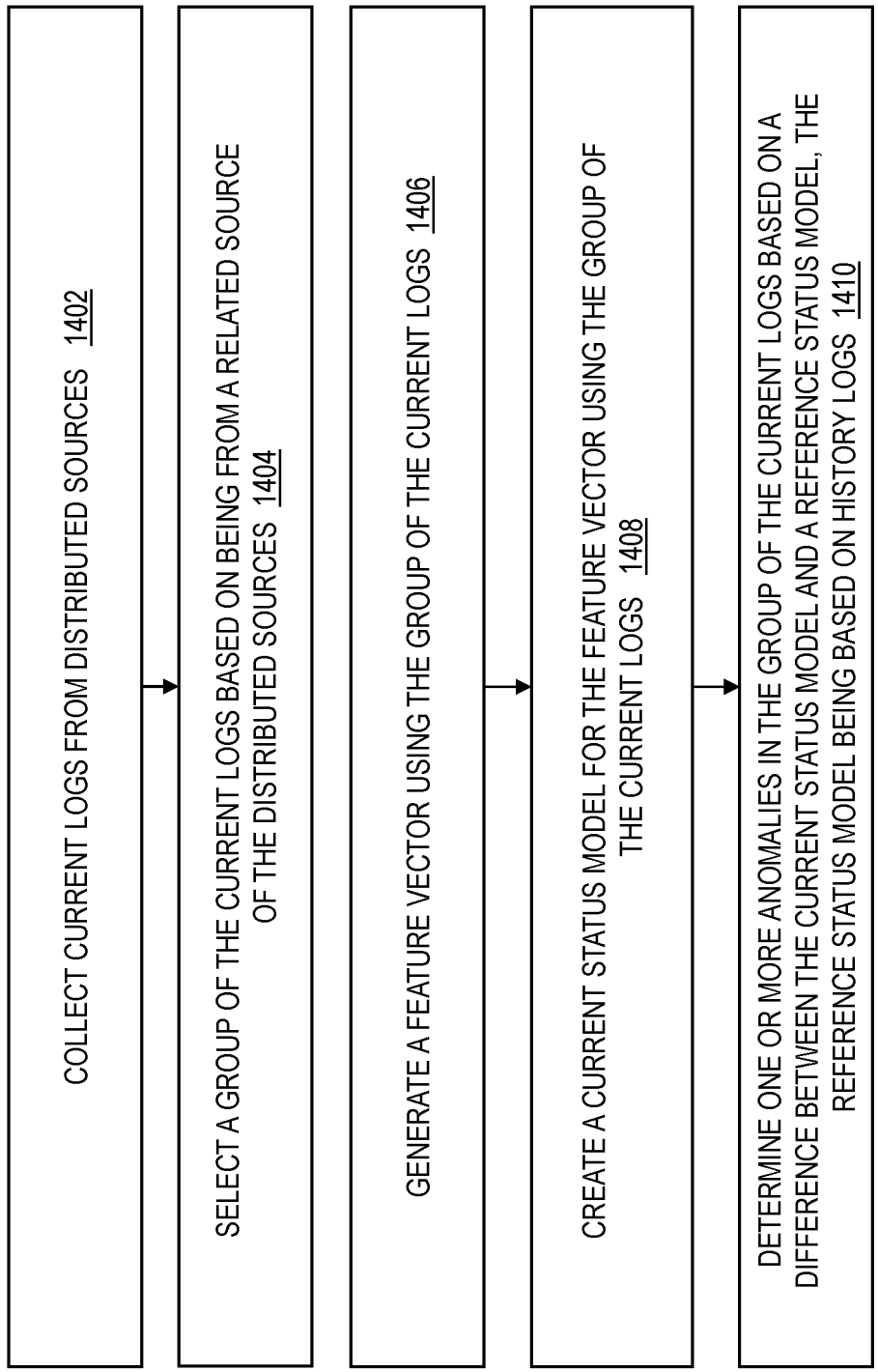
FIG. 14 depicts a flowchart of a method to perform log-based log status modeling and problem diagnosis for distributed applications in accordance with one or more embodiments of the present invention.

FIG. 14 is a flowchart of a method 1400 to perform log-based log status modeling and problem diagnosis for distributed applications according to one or more embodiments of the invention. At block 1402, software applications 230 of computer system 202 are configured to collect current logs (e.g., new logs 252) from distributed sources 210 and select a group (e.g., grouped new logs 253) of the current logs based on being from a related source of the distributed sources, for example, according to grouping rules 260 at block 1404. At block 1406, software applications 230 of computer system 202 are configured to generate a feature vector using the group of the current logs and to create a current status model (e.g., current status model 264) for the feature vector using the group (e.g., grouped new logs 253) of the current logs at block 1408. At block 1410, software applications 230 of computer system 202 are configured to determine one or more anomalies in the group of the current logs based on a difference between the current status model (e.g., current status model 264) and a reference status model (e.g., reference status model 262), the reference status model being based on history logs (e.g., grouped history logs 251).

The group (e.g., grouped new logs 253) of the current logs (e.g., new logs 252) are selected by using an identical software application. Generating the feature vector using the group of the current logs includes selecting one or more time windows (e.g., 10, 30, 60 minute time windows) and generating feature values for features (or terms) in the group of the current logs according to a similarity (or frequency) of the features in the group. The features include message identifications (e.g., Message IDs) of the group of the current logs (e.g., new logs 252). The feature values define the similarity of message identifications of the group of the current logs. Determining the one or more anomalies in the group of the current logs based on the difference between the current status model (e.g., current status model 264) and the reference status model (e.g., reference status model 262) comprises comparing the feature vector of the group of the current logs to a similar feature vector of the reference status model to determine one or more anomalous current logs of the group of the current logs having a problem, where the reference status model corresponds to a same application as the current status model. The one or more anomalies in the group of the current logs define a problem in one or more anomalous current logs of the group of the current logs, the problem being related to a software component, a hardware component, or both the software component and the hardware component of the related source for the one or more anomalous current logs of the group of the current logs.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 15:
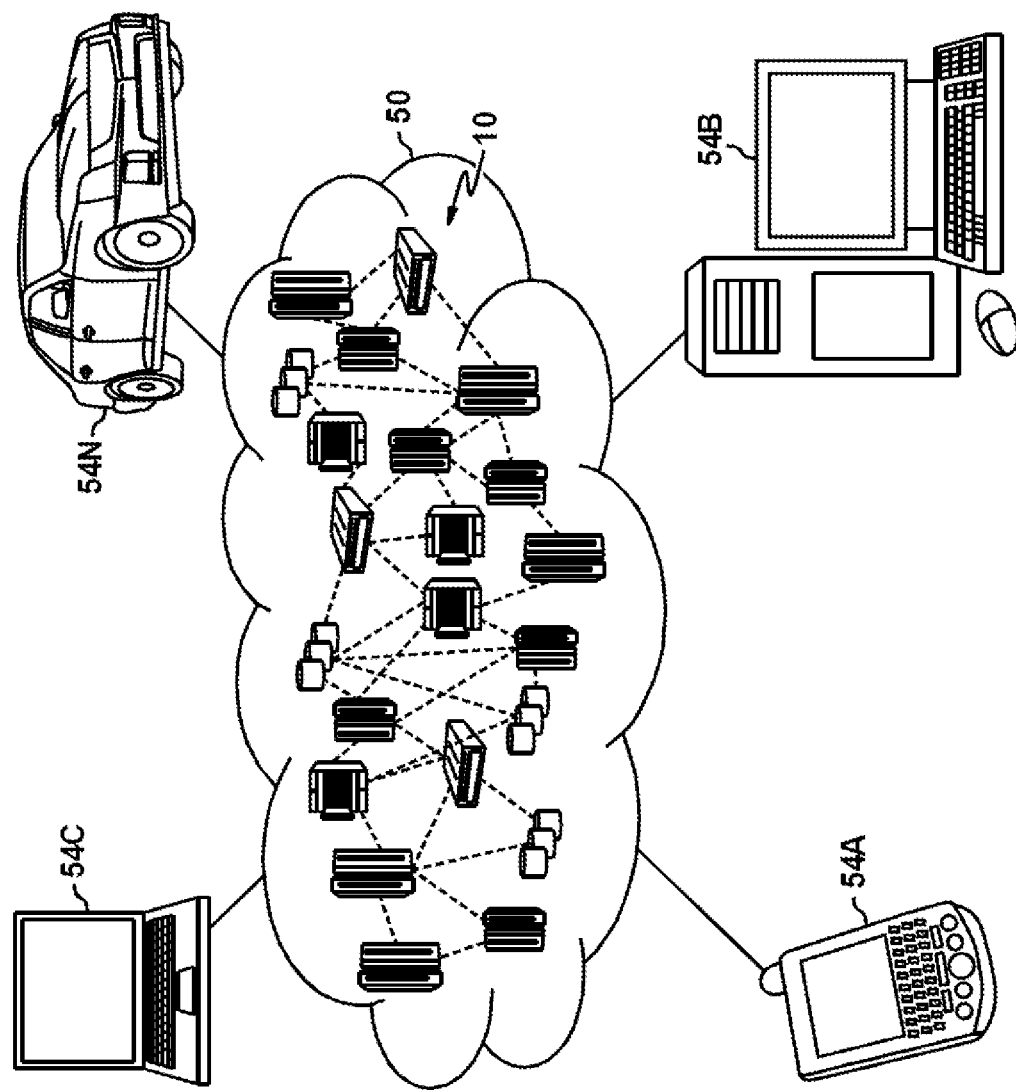
FIG. 15 depicts a cloud computing environment according to one or more embodiments of the present invention.

Referring now to FIG. 15, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 15 are intended to be illustrative only and that computing nodes 10 and cloud computing environment 50 can communicate with any type of computerized device over any type of network and/or network addressable connection (e.g., using a web browser).

Figure 16:
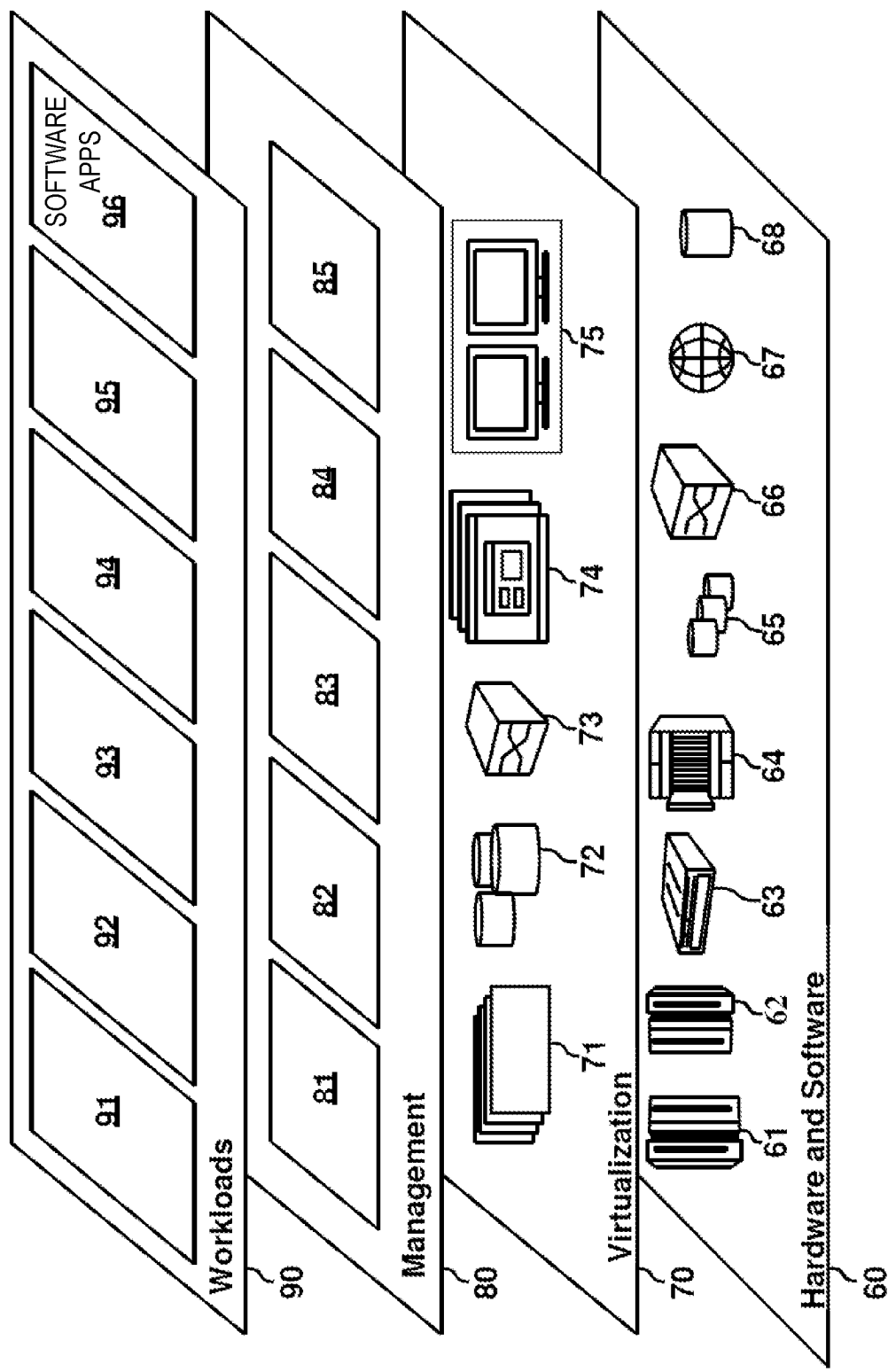
FIG. 16 depicts abstraction model layers according to one or more embodiments of the present invention.

Referring now to FIG. 16, a set of functional abstraction layers provided by cloud computing environment 50 (FIG. 15) is shown. It should be understood in advance that the components, layers, and functions shown in FIG. 16 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and software applications 96 (e.g., software applications 230, model modules 232, and analysis modules 234, etc. Also, software applications can function with and/or be integrated with Resource provisioning 81.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    collecting current logs from distributed sources;
    selecting a group of the current logs that are from a related source of the distributed sources, the related source comprises one or more computer systems in common within the group of the current logs;
    generating a feature vector using the group of the current logs;
    creating a current status model for the feature vector using the group of the current logs; and
    determining one or more anomalies in the group of the current logs based on a difference between the current status model and a reference status model, the reference status model being based on grouped history logs, the one or more anomalies being related to at least one problem on the one or more computer systems.

2. The computer-implemented method of claim 1, wherein the group of the current logs are selected by using an identical application.

3. The computer-implemented method of claim 1, wherein generating the feature vector using the group of the current logs comprises selecting one or more time windows and generating feature values for features in the group of the current logs according to a similarity of the features.

4. The computer-implemented method of claim 3, wherein the features comprise message identifications of the group of the current logs.

5. The computer-implemented method of claim 3, wherein the feature values define the similarity of message identifications in the group of the current logs.

6. The computer-implemented method of claim 1, wherein determining the one or more anomalies in the group of the current logs based on the difference between the current status model and the reference status model comprises comparing the feature vector of the group of the current logs to a similar feature vector of the reference status model to determine one or more anomalous current logs of the group of the current logs having a problem; and
    wherein the reference status model corresponds to a same application as the current status model.

7. The computer-implemented method of claim 1, wherein the one or more anomalies in the group of the current logs define a problem in one or more anomalous current logs of the group of the current logs, the problem being related to a software component, a hardware component, or both the software component and the hardware component of the related source for the one or more anomalous current logs of the group of the current logs.

8. A system comprising:
    a memory having computer readable instructions; and
    one or more processors for executing the computer readable instructions, the computer readable instructions controlling the one or more processors to perform operations comprising:
        collecting current logs from distributed sources;
        selecting a group of the current logs that are from a related source of the distributed sources, the related source comprises one or more computer systems in common within the group of the current logs;

generating a feature vector using the group of the current logs;

creating a current status model for the feature vector using the group of the current logs; and determining one or more anomalies in the group of the current logs based on a difference between the current status model and a reference status model, the reference status model being based on grouped history logs, the one or more anomalies being related to at least one problem on the one or more computer systems.

9. The system of claim 8, wherein the group of the current logs are selected by using an identical application.

10. The system of claim 8, wherein generating the feature vector using the group of the current logs comprises selecting one or more time windows and generating feature values for features in the group of the current logs according to a similarity of the features.

11. The system of claim 10, wherein the features comprise message identifications of the group of the current logs.

12. The system of claim 10, wherein the feature values define the similarity of message identifications in the group of the current logs.

13. The system of claim 8, wherein determining the one or more anomalies in the group of the current logs based on the difference between the current status model and the reference status model comprises comparing the feature vector of the group of the current logs to a similar feature vector of the reference status model to determine one or more anomalous current logs of the group of the current logs having a problem; and wherein the reference status model corresponds to a same application as the current status model.

14. The system of claim 8, wherein the one or more anomalies in the group of the current logs define a problem in one or more anomalous current logs of the group of the current logs, the problem being related to a software component, a hardware component, or both the software component and the hardware component of the related source for the one or more anomalous current logs of the group of the current logs.

15. A computer program product comprising a computer readable storage medium having program instructions embodied therewith, the program instructions executable by a processor to cause the processor to perform operations comprising:

collecting current logs from distributed sources;

selecting a group of the current logs that are from a related source of the distributed sources, the related source comprises one or more computer systems in common within the group of the current logs;

generating a feature vector using the group of the current logs;

creating a current status model for the feature vector using the group of the current logs; and determining one or more anomalies in the group of the current logs based on a difference between the current status model and a reference status model, the reference status model being based on grouped history logs, the one or more anomalies being related to at least one problem on the one or more computer systems.

16. The computer program product of claim 15, wherein the group of the current logs are selected by using an identical application.

17. The computer program product of claim 15, wherein generating the feature vector using the group of the current logs comprises selecting one or more time windows and generating feature values for features in the group of the current logs according to a similarity of the features.

18. The computer program product of claim 17, wherein the features comprise message identifications of the group of the current logs.

19. The computer program product of claim 17, wherein the feature values define the similarity of message identifications in the group of the current logs.

20. The computer program product of claim 15, wherein determining the one or more anomalies in the group of the current logs based on the difference between the current status model and the reference status model comprises comparing the feature vector of the group of the current logs to a similar feature vector of the reference status model to determine one or more anomalous current logs of the group of the current logs having a problem; and wherein the reference status model corresponds to a same application as the current status model.

* * * * *